United States Patent Office 3,421,383
Patented Jan. 14, 1969

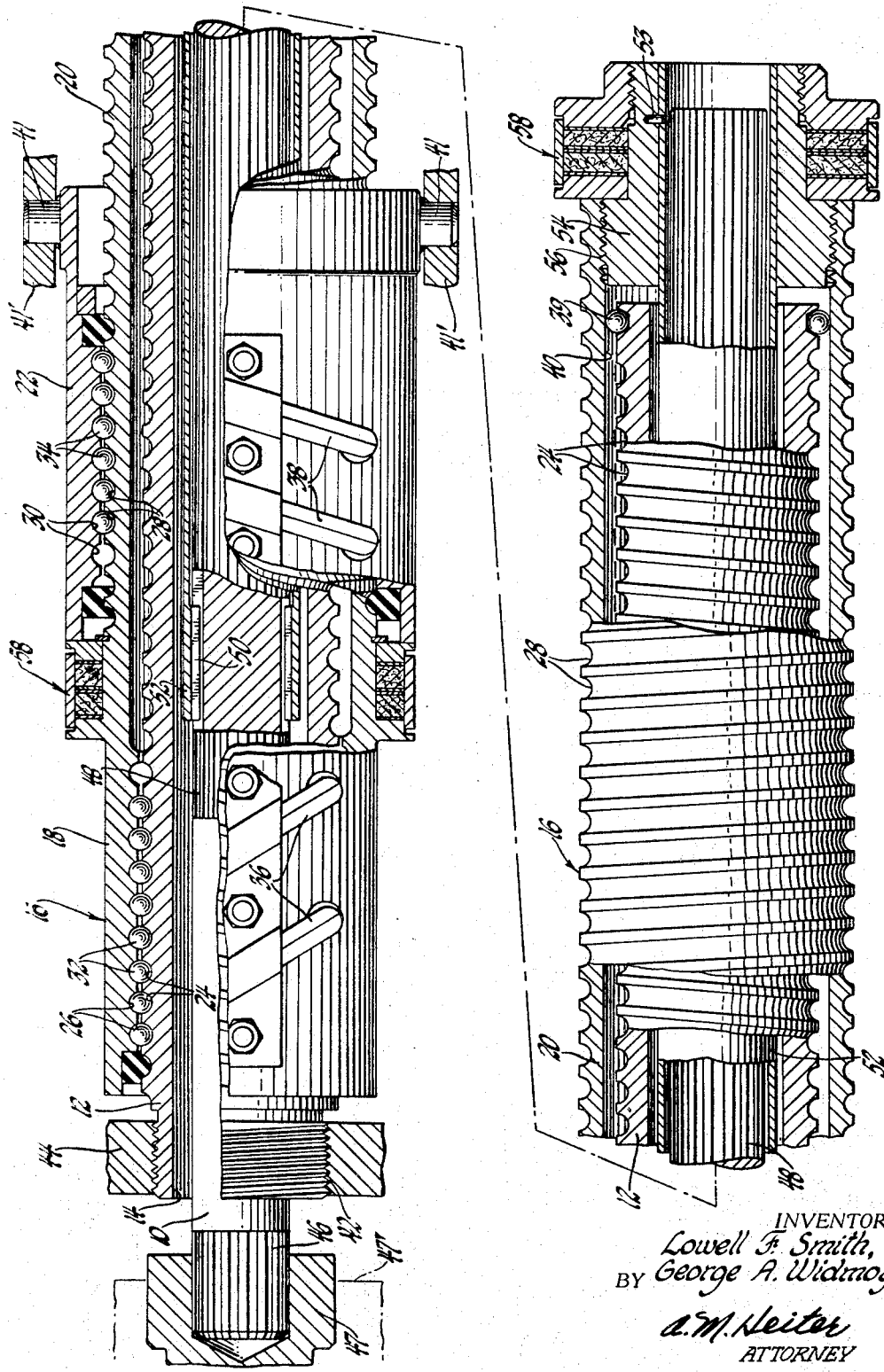

3,421,383
MULTIEXTEND SCREW MECHANISM
Lowell F. Smith, Dayton, Ohio, and George A. Widmoyer, Saginaw, Mich., assignors to General Motors Corporation, Detroit, Mich., a corporation of Delaware
Filed June 11, 1964, Ser. No. 374,428
U.S. Cl. 74—424.8                                12 Claims
Int. Cl. F16h 1/18; F16h 1/20

This invention relates to screw mechanisms and more particularly to multiextend screw mechanisms.

Screw mechanisms in general have utility in a wide range of applications since they can develop upon rotary input a relatively great linear thrust force and provide relatively longitudinal output movement. Such screw mechanisms are especially advantageous in the remote positioning of various devices since they may be driven by motors located at the points of installation controlled from a remote control station. In some screw mechanism installations especially in aircraft where it is desired to control the aircraft control surfaces, doors, canopies and the like, the screw mechanism is allocated a minimum of space when fully retracted and must be capable of rapid extension through a stroke often in excess of its overall minimum retracted length. In addition to installation requirements of compact size, rapid extension and length of stroke, it is desirable that the screw mechanism be a simple, low-cost structure having few parts and be easy to assemble and install.

This invention in embodimental form provides a multiextend screw mechanism employing a grounded inner screw member having a bore in which is received a shaft providing power input for the screw assembly. The power input shaft has external splines extending a substantial distance along its length which slidably engage with the internal splines in the bore of a sleeve rigidly secured at one end to an intermediate member. The intermediate member has both a nut portion and a screw portion and an outer nut member is arranged to encircle the screw portion while the nut portion is arranged to encircle the inner screw member. The nut portion and inner screw member are drivingly connected having complementary grooves providing a working race loaded with a train of balls and likewise the screw portion and the outer nut member are drivingly connected also having complementary grooves providing a working race loaded with a train of balls. Return passages are provided to recirculate the trains of balls and the helix of one working race extends in a direction opposite the helix of the other working race to provide multiextension as will be subsequently described. The outer nut member is connected to the device to be controlled and is free to translate but prevented from rotation.

In extension operation, the power input shaft is rotated with the result that the intermediate member having both the nut and screw portions rotates in the same direction by virtue of the engaged splines and connecting sleeve. As the intermediate member is rotated, it is caused to move longitudinally relative to the grounded inner screw member by virtue of the helical antifriction drive connection between the nut portion and the inner screw member since the inner screw member can neither rotate nor translate and at the same time the outer nut member since it is fixed against rotation is caused to extend relative to the intermediate member and in the same direction as the intermediate member by virtue of the antifriction helical ball connection between the outer nut member and the screw portion of the intermediate member. As the intermediate member extends with respect to the inner screw member, the internal splines of the connecting sleeve slide with respect to the external splines of the power input shaft which is prevented from translation and maintain the driving connection between the power input shaft and the intermediate member. To retract, the power input shaft is rotated in the opposite direction whereupon the outer nut member retracts relative to the intermediate member and at the same time the intermediate member retracts relative to the grounded inner screw member until the outer nut member and the intermediate member are fully retracted to complete a full cycle of extension and retraction operation.

It is an object of this invention to provide a screw mechanism employing a translating drive member providing multiextend operation having oppositely extending helical drives with a nontranslating power input continuously drive connected to provide power input to the translating drive member.

Another object of this invention is to provide a screw mechanism having a multiextending screw having an inner member threadably connected at one pitch angle to an intermediate member and the intermediate member threadably connected at an opposite pitch angle to an outer member with a continuous power input drive to the intermediate member to provide longitudinal movement of the intermediate member relative to the inner member and at the same time longitudinal movement of the outer member relative to the intermediate member and in the same direction.

Another object of this invention is to provide a multiextend screw mechanism having a nontranslating and rotatable power input member continuously drive connected through a sliding spline connection to an intermediate member having both a nut and a screw portion, the nut portion having an antifriction threaded connection with an inner screw member prevented from rotation and translation and the screw portion having an antifriction threaded connection with an outer nut member prevented from rotation, the antifriction threaded connections having helices extending in opposite directions and being operable to effect upon rotation of the power input member conjoint rotation of the intermediate member and longitudinal movement of the intermediate member relative to the inner screw member conjointly with longitudinal movement of the outer nut member relative to the intermediate member and in the same direction.

Another object of this invention is to provide a screw mechanism having an inner member having external screw threads, an intermediate member having internal nut threads cooperating with and translating on the external screw threads and external screw threads of opposite pitch to the internal nut threads on the intermediate member and an outer nut member fixed against rotation and having internal nut threads cooperating with and translating on the external screw threads on the intermediate member and a drive for the intermediate member.

These and other objects of the invention will be more apparent from the following description of the preferred embodiment illustrated in the accompanying drawing showing:

A view partly in elevation and partly in section of a multiextend screw mechanism constructed according to this invention is shown.

The multiextend screw mechanism illustrated and which is shown fully retracted generally comprises an input shaft 10 which is the innermost member, an inner screw member 12 having a bore 14 to freely accommodate input shaft 10, an intermediate member 16 having integral nut and screw portions 18 and 20 respectively and an outer nut member 22.

The inner screw member 12 and nut portion 18 have complementary helical ball grooves 24 and 26 respectively defining a first helical working race having a left-hand lead and the screw portion 20 and outer nut member 22 also having complementary helical ball grooves 28 and 30 respectively defining a second helical working race having a right-hand lead. Trains of balls 32 and 34 are continuously loaded in the first and second races respectively to complete the drive connections to transmit drive between intermediate member 16 and inner screw member 12 which is also an intermediate member and between intermediate member 16 and outer nut member 22 respectively when there is relative rotation between these respective pairs of parts. Conventional ball return or transfer tubes 36 and 38 secured to nut portion 18 and outer nut member 22 respectively cooperate with the races to provide endless circuits for ball circulation in a conventional manner during screw mechanism operation. Balls 39 mounted in an annular race, which is provided by an annular groove on the right-hand end of inner screw member 12 and the bore 40 of intermediate member 16, support the intermediate member 16 for rotation and translation relative to the inner screw member 12.

As well understood in the art, if one of the members 12 and 16 is held against axial movement and is free to be rotated relative to the other, such other member will be caused to move linearly if restrained against rotary movement. Again, in the case of members 16 and 22 if one of these members is held against axial movement and is free to be rotated relative to the other, such other member will be caused to be moved linearly if restrained against rotary movement. In the particular application contemplated, the outer nut member 22 is connected to the device to be moved and is prevented from rotation and is provided for that purpose with diametrically opposed connecting yoke pins 41 fitting in a nonrotatable yoke 41'. Inner screw member 12 is held against both axial movement and rotation and for that purpose is grounded through threads 42 to a stationary housing support 44. Intermediate member 16 is rotated to extend and retract the screw mechanism by being drivingly connected to power input shaft 10 in the manner now to be explained.

Input shaft 10, which has at its projecting left-hand end external splines 46 in mesh with internal splines of a motor output shaft 47 of a suitable power source 47' providing selective drive in opposite rotational directions, is prevented from translation by its connection to such power source and provides the power input and axial locating means for the input shaft 10 of the screw assembly. Input shaft 10 which extends centrally through bore 14 of inner screw member 12 has external splines 48 extending at a point near its left-hand end to its right-hand end slidably engaged with the internal splines 50 of a torque sleeve 52 received in bore 14. Torque sleeve 52 at its right-hand end is rigidly secured such as by pins 53 in a central bore of an end fixture 54 which is threadably secured at 56 to the right-hand end of intermediate member 16. Splines 48 and 50 continuously mesh during extension and retraction of the screw assembly to provide a continuous drive connection between input shaft 10 and intermediate member 16 as will be more thoroughly understood in the subsequent description of operation.

During extension and retraction operation, outer nut member 22 will translate longitudinally relative to intermediate member 16 and between selected limits. The maximum limits of travel of outer nut member 22 relative to intermediate member 16 is determined by the axially spaced compression stop assemblies 58 which serve to cushion and prevent jamming between nut member 22 and intermediate member 16 in the outer nut member's extreme extended and retracted positions, such compression stops being of the type shown and fully explained in copending application Ser. No. 297,257 of Lowell F. Smith entitled Nut and Screw Device, now Patent No. 3,195,366.

Describing now the operation, with the screw mechanism fully retracted as shown in the drawing, extension operation is effected by rotating input shaft 10 counterclockwise when viewed looking from the left-hand end of shaft 10 towards its right-hand end with the result that the intermediate member 16 rotates counterclockwise by virtue of the meshing splines 48 and 50, connecting sleeve 52 and connecting end fixture 54. As intermediate member 16 is rotated counterclockwise, it is caused to extend rightwardly relative to the grounded inner screw member 12 by virtue of the left-hand lead helical ball connection between nut portion 18 and inner screw member 12 and at the same time the outer nut member 22 since it is fixed against rotation is also caused to extend rightwardly and relative to intermediate member 16 by virtue of the right-hand lead helical ball connection between outer nut member 22 and screw portion 20. As intermediate member 16 extends rightwardly with respect to inner screw member 12, the internal splines 50 of sleeve 52 slide rightwardly with respect to the external splines 48 of input shaft 10 which is prevented from translation maintaining the driving connection between input shaft 10 and intermediate member 16 as the latter extends. At the limits of travel, outer nut member 22 will be in abutting relationship with the right-hand compression stop 58.

To retract, the input shaft 10 is rotated clockwise whereupon intermediate member 16 retracts leftwardly relative to the grounded inner screw member 12 and at the same time outer nut member 22 retracts leftwardly relative to intermediate member 16 until outer nut member 22 abuts with left-hand compression stop 58 corresponding to full retraction of these members to complete a full cycle of extension and retraction operation.

As used above, the screw grooves or threads have a greater longitudinal extent than the nut grooves so that the nuts can translate longitudinally on the screws in the manner described.

By this arrangement of parts including the two helical ball connections having helices extending in opposite directions and the continuous drive connection between the power input shaft and the intermediate member, there is provided a multiextend screw assembly having an extremely small overall length when fully retracted which is operable to provide a rapidly extending stroke determined by the pair of threaded connections. In addition, this assembly requires few parts and is easy to assemble to provide a simple, low-cost structure.

The above-described preferred embodiment is illustrative of the invention which may be modified by those skilled in the art within the scope of the appended claims.

What is claimed is:

1. In a multiextend screw mechanism the combination of
   (a) an inner member, a first intermediate member encircling said inner member, a second intermediate member encircling said first intermediate member, an outer member encircling said second intermediate member,
   (b) first thread means operatively threadably connecting said first intermediate member and said second intermediate member having a pitch angle extending in one direction, second thread means operatively threadably connecting said second intermediate member and said other member having a pitch angle extending in the opposite direction,
   (c) and torque transmitting means operable to prevent relative rotational movement and permit relative longitudinal movement between said inner member and said second intermediate member.

2. The multiextend screw mechanism set forth in claim 1 and said torque transmitting means comprising a sleeve member rigidly secured at one end to said second intermediate member, the other end of said sleeve member having first spline means and said inner member having second spline means extending along its length slidably engaged with said first spline means.

3. The multiextend screw mechanism set forth in claim 2 and said second spline means extending in a distance along said inner member at least the maximum length of travel of said second intermediate member relative to said first intermediate member that occurs upon rotation of said second intermediate member relative to said first intermediate member.

4. The multiextend screw mechanism set forth in claim 1 and said first and second thread means including antifriction elements to provide substantially friction free threaded connections.

5. In a multiextend screw mechanism the combination of
(a) an input member, a first intermediate member surrounding said input member, a second intermediate member,
(b) said first intermediate member having a screw portion and said second intermediate member having a nut portion, said screw and nut portions having complementary helical grooves defining a first working race whose helix extends in one direction, a return passage operatively connecting the ends of said first working race to provide a continuous circuit and a train of antifriction elements mounted in this circuit with a portion of this train being continually loaded in said first working race to provide a driving connection between said first and second intermediate members,
(c) said second intermediate member also having a screw portion, said screw portion and said nut member having complementary helical grooves defining a second working race whose helix extends in a direction opposite said one direction of the helix of said first working race, a return passage operatively connecting the ends of said second working race to provide a continuous circuit and a train of antifriction elements mounted in this circuit with a portion of this train being continuously loaded in said second working race to provide a driving connection between said second intermediate member and said nut member,
(d) and drive transmitting means including spline means operable to prevent relative rotational movement and permit relative axial movement between said second intermediate member and said input member.

6. The multiextend screw mechanism set forth in claim 5 and said trains of antifriction elements being trains of balls.

7. In a multiextend screw mechanism the combination of
(a) an inner screw member, an intermediate member having a nut portion and a screw portion, an outer nut member,
(b) complementary helical grooves on said inner screw member and said nut portion providing one working race having a helix extending in one direction, antifriction elements loaded in said one working race providing a driving connection between said inner screw member and said intermediate member,
(c) complementary helical grooves on said screw portion and said outer nut member providing another working race having a helix extending in a direction opposite said one direction, antifriction elements loaded in said other working race providing a driving connection between said intermediate member and said outer nut member,
(d) and said inner screw member having an axially extending aperture, a torque input member having a portion extending through said aperture, and torque transmitting means operatively connecting the extending portion of said torque input member to said intermediate member preventing relative rotational movement and permitting relative axial movement between said torque input member and said intermediate member.

8. The multiextend screw mechanism set forth in claim 7 being characterized in that upon rotation of said torque input member said outer nut member and said intermediate member move in the same axial direction at the same time when said torque input member is prevented from moving axially, said inner screw member is prevented from rotating and moving axially and said outer nut member is prevented from rotating.

9. In a multiextend screw mechanism the combination of
(a) an inner member having external screw threads,
(b) an intermediate member having internal nut threads operatively cooperating with and translating on said external screw threads of said inner member, said intermediate member also having external screw threads of opposite pitch to said internal nut threads,
(c) and an outer nut member having internal nut threads operatively cooperating with and translating on said external screw threads on said intermediate member and a drive member operatively connected to said intermediate member.

10. The multiextend screw mechanism set forth in claim 9 and said pair of cooperating threads being ball grooves providing a pair of working races, trains of balls loaded in said pair of working races and separate ball return means external of said intermediate member secured to the exteriors of said intermediate member and said outer nut member providing separate return passages operatively connecting the ends of said working races for return ball travel.

11. In an extensible actuator, the combination of: a support member, a hollow nonrotary screw fixed at one end to said support member, a rotary nut mounted to turn on said screw, a hollow rotary screw secured to turn with said rotary nut, a nonrotary nut mounted on said rotary screw, means for restraining said nut from rotation, a drive shaft rotatably mounted on the support member and extending through said nonrotary screw, and means including a spline drive connection enabling the drive shaft to turn said rotary screw, whereby rotation of the drive shaft causes simultaneous axial travel of each nut upon its respective screw, each nut having an axial length materially shorter than its respective screw whereby both screws project beyond both nuts when the drive shaft is turned to retract said nuts.

12. In an extensible actuator, the combination of: a support member, a hollow nonrotary screw fixed at one end to said support member, a rotary nut mounted to turn on said screw, a hollow rotary screw secured to turn with said rotary nut, a nonrotary nut mounted on said rotary screw, means for retaining said nut from rotation, a drive shaft extending through said nonrotary screw, and means including a spline drive connection enabling the drive shaft to turn said rotary screw, whereby rotation of the drive shaft causes simultaneous axial travel of each nut upon its respective screw, each nut having an axial length materially shorter than its respective screw whereby both screws project beyond both nuts where the drive shaft is turned to retract said nuts.

References Cited

UNITED STATES PATENTS

| 2,458,272 | 1/1949 | Jones | 74—424.8 |
| 3,154,954 | 11/1964 | Geyer | 74—424.8 |

DONLEY J. STOCKING, *Primary Examiner.*

LEONARD H. GERIN, *Assistant Examiner.*

UNITED STATES PATENT OFFICE
CERTIFICATE OF CORRECTION

Patent No. 3,421,383                                                      January 14, 1969

Lowell F. Smith et al.

It is certified that error appears in the above identified patent and that said Letters Patent are hereby corrected as shown below:

Column 4, line 33, after "grooves" insert -- or threads --; line 62, "other" should read -- outer --. Column 5, line 15, after "member" insert -- surrounding said first intermediate member, a nut member surrounding said second intermediate member --.

Signed and sealed this 24th day of March 1970.

(SEAL)
Attest:

Edward M. Fletcher, Jr.                                WILLIAM E. SCHUYLER, JR.
Attesting Officer                                                 Commissioner of Patents